United States Patent

[11] 3,581,482

[72] Inventors Walter E. Reber;
 Adrien J. Formery; Wilhelm H. M. Van Den Heuvel, all of Saverne (Bas-Rhin), France
[21] Appl. No. 778,246
[22] Filed Nov. 22, 1968
[45] Patented June 1, 1971
[73] Assignees Kuhn Freres & Cie,
 Saverne (Bas-Rhin), France.
[32] Priority Dec. 22, 1967
[33] France
[31] 133568

[54] DEVICES FOR FASTENING AND PROTECTING THE CUTTERS OF ROTARY MOWING MACHINES
8 Claims, 5 Drawing Figs.
[52] U.S. Cl. ................................................. 56/295
[51] Int. Cl. .............................................. A01d 55/18
[50] Field of Search .......................... 56/6, 25.4, 295

[56] References Cited
UNITED STATES PATENTS

| | | | |
|---|---|---|---|
| 2,654,986 | 10/1953 | Gold | 56/295 |
| 2,815,631 | 12/1957 | Northcote et al. | 56/25.4 |
| 3,000,165 | 9/1961 | Lill | 56/25.4 |
| 3,010,269 | 11/1961 | Maguire | 56/295 |
| 3,203,161 | 8/1965 | Breisch et al. | 56/295 |

Primary Examiner—Russell R. Kinsey
Attorney—Stevens, Davis, Miller and Mosher

ABSTRACT: Device for fastening and protecting cutter elements of a rotary mowing machine which are mounted on the marginal portion of supporting discs secured to the main bar of the mowing machine, characterized in that each cutter element is secured by a suitable bolt provided with a self-locking nut protected by a device consisting of an integral collar and washer assembly adapted, when tightened, to permit the backward pivoting movement of the relevant cutter element when the latter engages a resistant obstacle, adequate members being provided for preventing the distortion of said cutter elements and protecting the disc fastening means.

PATENTED JUN 1 1971
3,581,482
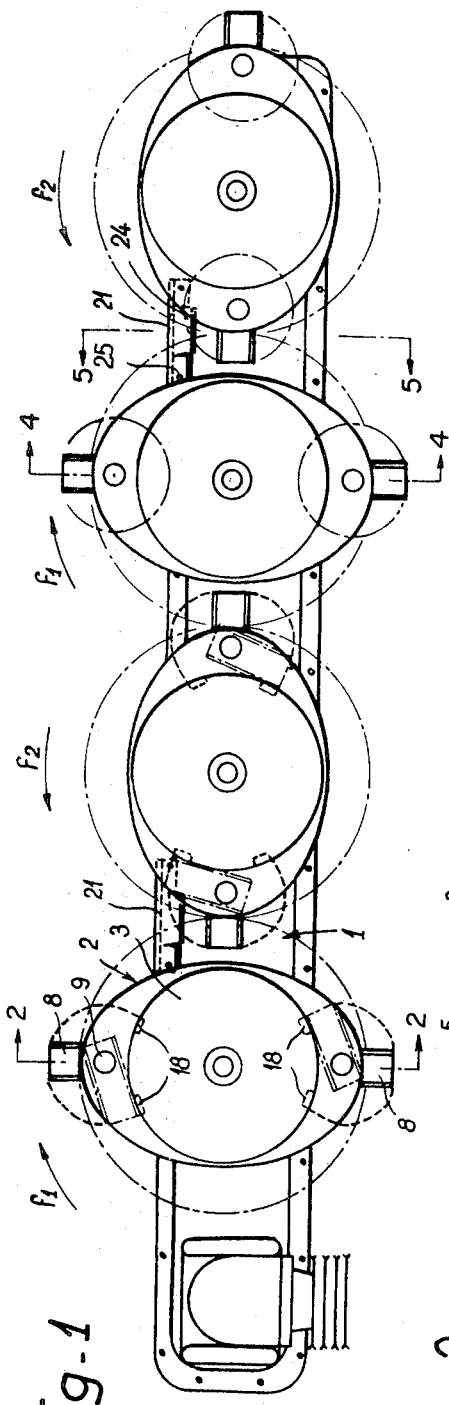
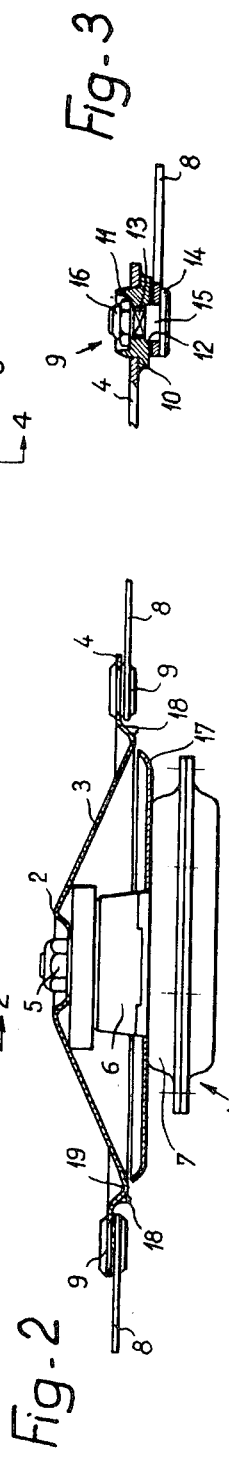
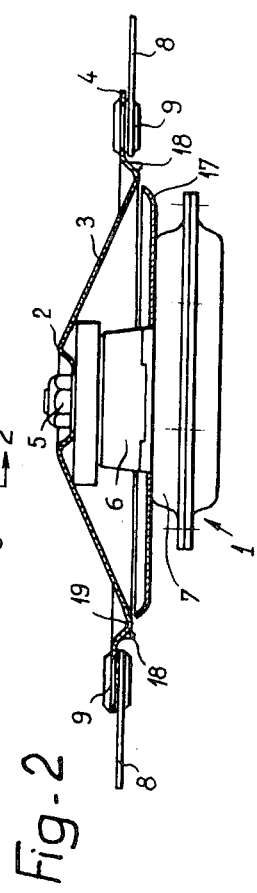
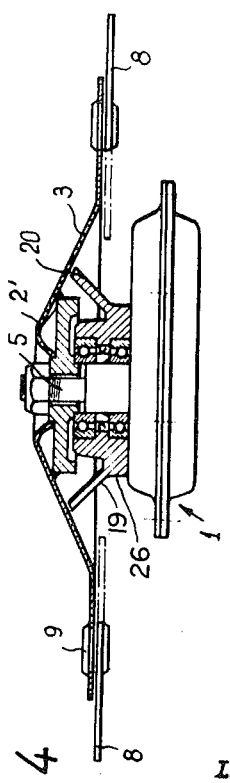
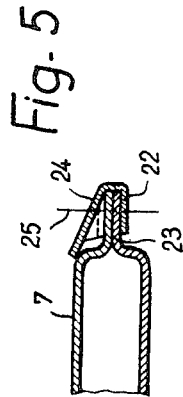
INVENTOR
WALTER E. REBER
ADRIEN J. FORMERY
WILHELM H.M. VAN DEN HEUVE
By Stevens, Davis, Miller & Mosher
ATTORNEYS

DEVICES FOR FASTENING AND PROTECTING THE CUTTERS OF ROTARY MOWING MACHINES

This invention relates to a disc-type rotary mower.

Disc-type rotary mowing machines are already known wherein the rotary motion of the disc supporting the cutters is controlled from underneath through a transmission ensuring a synchronous coupling of the discs, notably in mowing machines of the type described in the U.S. Pat. application Ser. No. 703,082 filed Feb. 5, 1968 and issued as U.S. Pat. No. 3,524,306.

This invention is directed more particularly to improvements in the devices for fastening and protecting the cutter elements and their supports.

The device for fastening and protecting the cutter elements of a rotary mowing machine which are mounted on the outer periphery of supporting discs secured to the main bar of the mowing machine is characterized in that each cutter element is secured by means of a suitable bolt provided with a self-locking nut protected by a collar-and-washer device the tightening of which permits the backward pivoting movement of the cutter element in case of engagement thereof with a particularly resistant obstacle, adequate means being provided for preventing the cutter distortion and protecting the disc mounting.

The advantages and features characterizing the device according to this invention will appear more clearly as the following description proceeds with reference to the accompanying drawing illustrating diagrammatically by way of example a typical form of embodiment of the invention. In the drawing:

FIG. 1 illustrates in plan view the main supporting bar of a rotary mowing machine;

FIG. 2 is an enlarged side view of an assembled single supporting disc shown in part-sectional view on the bar, the section being taken along the line 2-2 of FIG. 1;

FIG. 3 is a longitudinal section showing on a larger scale details of the cutter-element-fastening means;

FIG. 4 is an enlarged cross section taken along the line 4-4 of FIG. 1 and showing a modified form of embodiment of the support, and FIG. 5 illustrates in detail a wear plate shown in cross section taken along the line 5-5 of FIG. 1.

Referring first to FIGS. 1 and 2, it will be seen that a main bar 1 of a rotary mowing machine carries, say, four supporting discs 2 each consisting of a tapered portion 3 having a flat annular flange 4 preferably of elliptic configuration. Each disc is secured to a spindle 5 journaled in a bearing fitted in a case 6 secured to the upper portion 7 of said bar 1 to constitute a casing enclosing a transmission mechanism designed for rotatably driving all the spindles 5 and therefore the discs 2. Two adjacent discs revolve in opposite directions as shown by the arrows $f_1$ and $f_2$.

Each disc 2 carries at diametrally opposite points located along the major axis of the ellipse a pair of cutters 8, each cutter comprising two opposite cutting or sharp edges. Each cutter element 8 is secured to the flat annular flange 4 by means of a bolt 9.

To avoid the premature wear and tear of the fastening means under certain service conditions, for example by sand, stones or other foreign substances, on both the upper and lower surfaces, as this premature wear and tear would render more complicated the removal of a cutter element, it is a first object of this invention to contemplate the fastening of the cutter element as shown in FIG. 3 by using a combined washer and collar device 10 having its washer portion inserted between the cutter element 8 and the disc flange 4. The upper, collar-shaped portion 11 of device 10 extends through a bore formed in the flange portion 4 of disc 2. The washer portion is either welded to the lower face of said flange 4 or formed integrally with a die-forged or cast-iron disc, and defines a lower cylindrical bore, a shoulder 12 denoting the end of said bore, and then a square-shaped or flattened hole 13.

The fastening bolt 9 comprises a flat head 14 engaging the lower surface of cutter element 8, a cylindrical portion 15 abutting against the aforesaid shoulder 12, a square or flat portion engaging the hole 13 and a screw-threaded end portion adapted to be engaged by a self-locking nut 16 fitting in the collar-shaped portion 11 of device 10.

The cylindrical portion 15 permits centering the screw as well as the holding thereof in the vertical direction; the function of the square or flat portion is to lock the screw during the tightening or releasing thereof, and the collar 11 protects the nut 16. The space available in the upper portion of this collar must be so dimensioned that a socket or box spanner can be inserted therein.

In order to protect this portion from possible damages which would make difficult the removal of cutter element 8, the collar and flange device 10 are preferably hardened.

The cutter element 8 is tightened in position in such a manner that it can pivot on the cylindrical portion 15 of the screw and recede when a resistant obstacle is met thereby.

A deflector plate 17 in the form of a shallow tray having an upturned edge directed towards the tapered portion 3 of disc 2 is secured beneath this disc 2 to the upper portion 7 of bar 1 as shown in FIG. 2 in order to protect the case 6 against the ingress of the mowed grass. A gap is provided between the outer edge of the deflector plate and the lower plane of the disc 2 for avoiding any contact between the deflector and the disc.

To prevent a cutter element 8 from contacting the deflector plate 17, stop members 18 are welded to a rib 19 formed on the disc 2 so that in case a cutter element 8 is pushed back by a resistant obstacle it can retract completely beneath the disc flange 4 as shown in dot-and-dash lines in the left-hand portion of FIG. 1.

When mowing an area containing a relatively large number of stones wherein the hardened cutter element 8 is likely to damage the stop members 18 in case of strong shocks, it is preferable to provide cutter fastening means permitting the rotation of the cutter about its axis through 360° as shown in the right-hand portion of FIG. 1 and in FIG. 4.

In this case, the tapered portion 3 of disc 2' does not comprise any reinforcing rib at the cutter passage areas and the stop members are dispensed with. The supporting disc 2' is so reinforced that the stability is preserved. The diameter of deflector is reduced to permit the passage of the rotary cutter elements 8. However, it is advisable in this case to combine the bearing case 6 and the deflector into a single and same part 26 as illustrated in FIG. 4. Thus, the necessity of adjusting the deflector for minimizing the gap left between the deflector and the disc 2 is avoided, and the part is stiffer while leaving a relatively small clearance. Of course, it is clear that the outer edge 20 of the resulting assembly must be concentric to the bearing axis.

Although the cutter elements 8 can yield backwards when they engage a relatively resistant obstacle it is obvious that on a stony ground they will not always yield and are therefore likely to be bent. The downwardly bent cutter element may thus damage the transmission casing 1, notably the upper portion 7 thereof over which the cutter element moves backwards as seen in the direction of travel of the mowing machine.

To avoid this inconvenience a pair of wear plates 21 are secured to the front side of bar 1, as shown in FIGS. 1 and 5. Each plate 21 consisting of a flat lip 22 surrounding the outer flange 23 of the casing comprises an integral upwardly and inwardly inclined extension 24 bearing against the upper portion 7 of the casing. The wear plates are secured by means of the assembling bolts 25 of casing 1 between the first and second disc, on the one hand, and between the third and fourth disc, on the other hand. The cutter element which has been bent downwards by its engagement with a resistant obstacle will thus be straightened during its passage on the inclined portion 24 of the wear plate.

We claim:

1. A device for fastening and protecting cutter elements of a rotary mowing machine, having a main bar, rotating supporting discs secured to the main bar by means of a spindle journaled in a bearing fitted in a case secured to the upper portion of said bar, said discs having a tapered portion and a marginal flat annular flange parallel to said bar portion with a plurality of cutter elements secured to said flange beneath said disc, said device comprising pivot bolts securing said cutter elements to said flange and permitting pivoting movement of each cutter element on its bolt, an integral collar-and-washer assembly in said disc flange for each bolt, a self-locking nut on each bolt fitting entirely in the collar-shaped portion of said assembly, means for protecting said cutters against bending and means for protecting said disc spindle bearings against any ingress.

2. A device according to claim 1, wherein said flange of the supporting disc has bores receiving said collar-and-washer assembly, said assembly being welded to said flange.

3. A device according to claim 1, wherein said collar-and-washer assembly is an integral part of said supporting disc.

4. A device according to claim 1, wherein the lower face of said collar-and-washer assembly defines a cylindrical bore, a shoulder at the end of the bore and a flattened hole, and said bolt securing the cutter comprising a cylindrical portion permitting the pivotal movement of said cutter element and abutting against the shoulder of said assembly, and a flat portion engaging said flattened hole of the assembly, said cylindrical portion being centered by said bore and said flat portion locking the bolt against rotation.

5. A device according to claim 1, further comprising a reinforcing rib formed on said supporting disc and provided with stop members for stopping a backward movement of said pivoting cutter elements when they pivot beneath said flange of the disc.

6. A device according to claim 1, wherein said supporting disc has a reinforcing rib interrupted to provide passage for said cutter elements.

7. A device according to claim 1, wherein the means for protecting said disc spindle bearings comprises a tapered deflector integral with said case of the bearing and having its outer edge concentric to said spindle and leaving only a minimum gap between it and said supporting disc.

8. A device according to claim 1, wherein the means for protecting said cutters against bending comprises a wear member secured between two adjacent supporting discs to said bar of the mowing machine so as to fit around the marginal portion of said bar, said wear member having a raised portion engaging the upper portion of said bar in order to straighten the cutters in case these have previously been bent downwards by their engagement with a resistant obstacle.